(12) United States Patent
Averianov et al.

(10) Patent No.: US 10,825,250 B2
(45) Date of Patent: Nov. 3, 2020

(54) METHOD FOR DISPLAYING OBJECT ON THREE-DIMENSIONAL MODEL

(71) Applicant: Vitalii Vitalievich Averianov, Tula (RU)

(72) Inventors: Vitalii Vitalievich Averianov, Tula (RU); Andrei Valerievich Komissarov, Tula (RU)

(73) Assignee: DEVAR ENTERTAINMENT LIMITED, Nicosia (CY)

( * ) Notice: Subject to any disclaimer, the term of this patent is extended or adjusted under 35 U.S.C. 154(b) by 94 days.

(21) Appl. No.: 15/748,317

(22) PCT Filed: Jul. 11, 2016

(86) PCT No.: PCT/RU2016/050020
§ 371 (c)(1),
(2) Date: Jan. 29, 2018

(87) PCT Pub. No.: WO2017/014680
PCT Pub. Date: Jan. 26, 2017

(65) Prior Publication Data
US 2020/0286290 A1 Sep. 10, 2020

(30) Foreign Application Priority Data
Jul. 17, 2015 (RU) .................... 2015128991

(51) Int. Cl.
*G06T 19/20* (2011.01)
*G06T 19/00* (2011.01)
(Continued)

(52) U.S. Cl.
CPC .............. *G06T 19/006* (2013.01); *G06T 7/38* (2017.01); *G06T 7/70* (2017.01); *G06T 17/00* (2013.01);
(Continued)

(58) Field of Classification Search
CPC ......... G06T 19/006; G06T 19/20; G06T 7/70; G06T 17/00; G06T 7/38; G06T 2219/2004; G06T 2207/10016
See application file for complete search history.

(56) References Cited

U.S. PATENT DOCUMENTS

2005/0116964 A1   6/2005   Kotake et al.
2006/0195858 A1   8/2006   Takahashi et al.
(Continued)

FOREIGN PATENT DOCUMENTS

RU    2463663 C2    10/2012

OTHER PUBLICATIONS

Hoshino et al. "A match moving technique for merging CG cloth and human movie sequences", Dec. 23-29, 2001, (Year: 2001).*

*Primary Examiner* — Robert J Craddock
(74) *Attorney, Agent, or Firm* — Nadya Reingand; Yan Hankin

(57) ABSTRACT

The invention relates to the field of information technology. The present invention involves obtaining an image, said image being formed using a video camera, and forming a model, including identifying points of interest on frames of an image and determining the coordinates thereof, shifting the video camera, and receiving data regarding the parameters of the shift; computing forecastable spatial coordinates for sectors in which actual spatial objects may be found, which are displayed on the image using corresponding points of interest; computing the coordinates of an area of a frame for each indicated sector in which a corresponding point of interest is expected to be found, performing a search for the point of interest within the bounds of the indicated area of the frame, and, if the point of interest is found, storing to memory the spatial coordinates of the corresponding sector; correlating images of points of interest to the sectors corresponding thereto on a spatial model, identifying (Continued)

flat and/or curved surfaces on the spatial model, extracting from memory a model of an additional object, and forming signals for controlling same; computing results for the interaction between the model of the additional object and the parameters of the spatial model, and forming a signal for the image of the additional object superimposed on the image formed by the video camera and outputting same to a display.

13 Claims, 3 Drawing Sheets

(51) Int. Cl.
　　　*G06T 7/70*　　　　(2017.01)
　　　*G06T 7/38*　　　　(2017.01)
　　　*G06T 17/00*　　　(2006.01)
(52) U.S. Cl.
　　　CPC .... *G06T 19/20* (2013.01); *G06T 2207/10016* (2013.01); *G06T 2219/2004* (2013.01)

(56) References Cited

U.S. PATENT DOCUMENTS

| | | |
|---|---|---|
| 2012/0001939 A1 | 1/2012 | Sandberg |
| 2012/0092328 A1* | 4/2012 | Flaks .................. G06F 3/012 345/419 |
| 2014/0036129 A1 | 2/2014 | Nonaka et al. |
| 2014/0176606 A1 | 6/2014 | Narayan et al. |
| 2017/0013279 A1* | 1/2017 | Puri .................... H04N 19/527 |

* cited by examiner

METHOD FOR DISPLAYING OBJECT ON THREE-DIMENSIONAL MODEL

CROSS-REFERENCE TO RELATED APPLICATIONS

The present application is a National Stage filing for PCT Patent Application Ser. No. PCT/RU16/050020, filed Jul. 11, 2016, which claims the benefit of the filing dates of Russian Patent Application Ser. No. RU 2015/128991, filed Jul. 17, 2015, the disclosure of which is incorporated in its entirety herein.

FIELD OF THE INVENTION

The invention relates to the field of information technology, computer technology, namely, the processing and generation of image data, image processing for computer graphics, and can be used to visualize 3D models in an image.

BACKGROUND OF THE INVENTION

The closest technical prototype is a method for mapping glacial geomorphology, which contains the steps of: taking the image of the sector being explored, obtained by a satellite; taking a digital model of the elevations of the sector being explored; Identifying plains and ridges on the digital elevation model; identifying marshes and forests in an image obtained by satellite; and forming a glaciological map with glacial features, based on identified plains, ridges, marshes and forests. (See RU 2519667 C2, cl. GO C11/06, CJO6T17/05).

A known method can be implemented to visualize the results of modeling natural processes, taking into account the cartographic information of the terrain.

The disadvantage of the known method is its limited application of only mapping the results of modeling processes on the terrain for which digital elevation maps exist. The known method can not be used to display simulation results on the surface of movable objects or objects that are not tied to the terrain.

The known solution does not allow the implementation of additional objects in the constructed model and determine the results of the interaction of additional objects with the model.

This drawback limits the scope of the application of the known method.

SUMMARY OF THE INVENTION

The technical result of the present invention is the widening of the scope of application by providing the possibility of forming a 3D model without involving additional data on the sector being explored, providing the possibility of forming a 3D model of movable objects or the internal space of objects, and providing the possibility of obtaining the results of interaction of the 3D model with models of various objects.

This result is achieved by the method of displaying an object on a 3D model consisting in obtaining an image formed by a video camera and further forming a model, identifying interest points on the image frames and determining their coordinates on the frame, moving the video camera, obtaining data on the parameters of the video camera motion, on the basis of which the calculated values of the spacious coordinates of the sectors in which it is possible to find the details of real spaces, displayed on the image by the corresponding interest points, as a result of the movement of the video camera, and determine the coordinates of the area on the frame, for each of the sectors in which a corresponding interest point is expected to be detected, the objects search for the interest point within the specified area on the frame, and its location is stored in memory 3D coordinates of the relevant sector, specify the 3D coordinates of these sectors by implementing the listed actions for afterwards the images of the interest points from the spacious coordinates of the corresponding sectors on the 3D model are compared to the image frames obtained from different points in the trajectory of motion of the video camera, the flat and curved surfaces are detected on the 3D model, the model of the additional object is extracted from the memory and the signals for its control are formed within the 3D model, calculate the results of the interaction of the additional object model with the parameters of the 3D model, form and output for displaying an image signal is an additional object superimposed on the image formed by the video camera in real time.

In addition:
  interest point is a group of adjacent image points that have a characteristic configuration that is stored on a set of successive image frames,
  the search area of interest point on the frame corresponds to the 3D sector whose angular coordinates are determined taking into account the parameters of the optical system of the video camera,
  the size of the image of the additional object is selected based on the dimensions of the 3D model and/or the user manually,
  implementing scaling and/or rotating, and/or the 3D transformation, and/or the situational transformation of the image of the additional object interacts with the parameters of the 3D model,
  obtaining signals containing an estimate of the direction and magnitude of movement of the video camera generated by the frame analysis tools,
  receiving data on the parameters of movement of the video camera in the form of signals containing an estimate of the direction and magnitude of movement of the video camera generated at the output of gyroscopic sensors or velocity and direction sensors or acceleration sensors,
  forming controlling signals of the additional object model by employing user's influence on the controls of the image forming device,
  moving the video camera in an arbitrary direction and/or in accordance with predetermined recommendations,
  storing only the 3D coordinates of the sector as refined 3D coordinates of the sector, that coincide with the video images computed on the previous frame,
  detecting images of predetermined objects and integrate their 3D properties into the 3D model,
  storing in the memory fragments of the model, including those corresponding to those real details of space that have ceased to fall into the eyeshot of the video camera,
  revealing flat and/or curved surfaces on the 3D model based on the analysis of 3D coordinates of sectors,
  revealing flat and/or curved surfaces on the 3D model based on analysis of image parameters of sections of the frame spanning multiple interest points.

BRIEF DESCRIPTION OF THE DRAWINGS

The manner in which the object is displayed on the 3D model is explained with the aid of the drawings, wherein FIG. 1 schematically shows one embodiment of a method in an automotive-related game, FIG. 2 schematically shows the process of refinement of 3D coordinates as a result of image processing of three frames of the video image.

DETAILED DESCRIPTION OF THE PREFERRED EMBODIMENT

Figure 1:
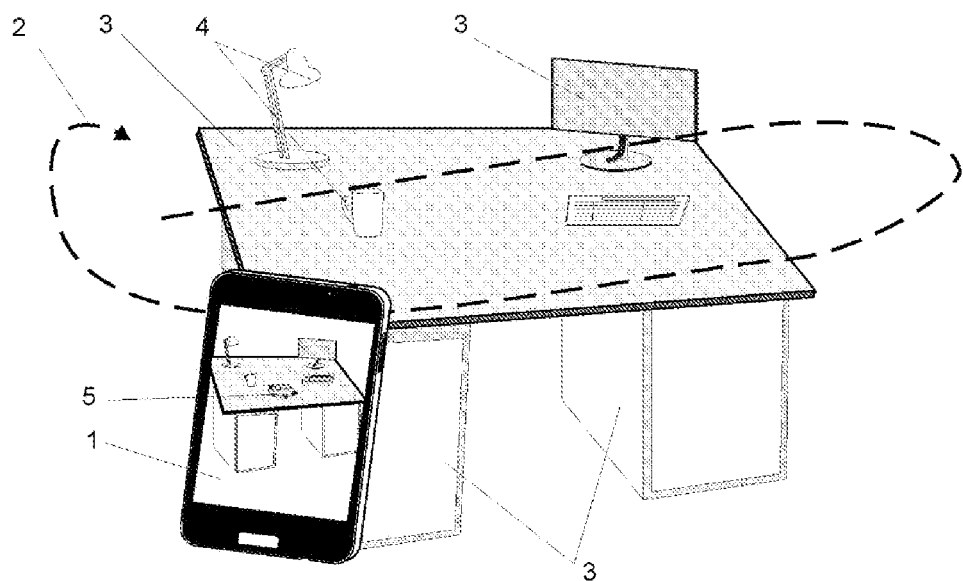
Figure 2:
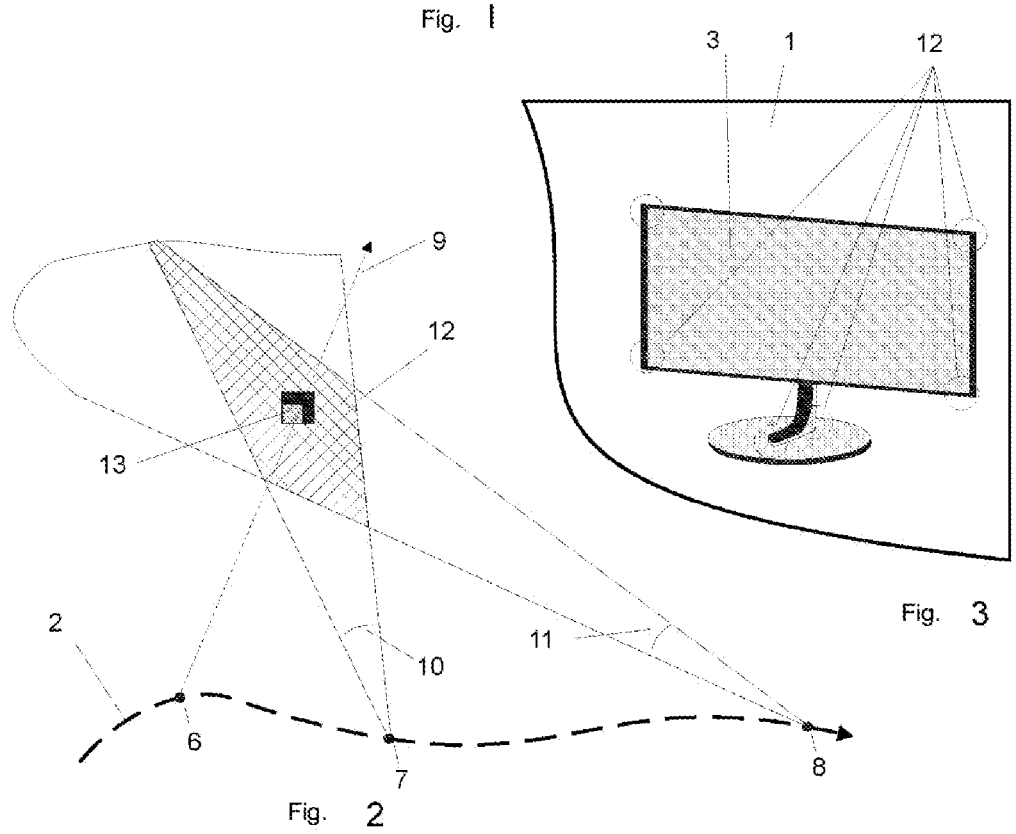
Figure 3:
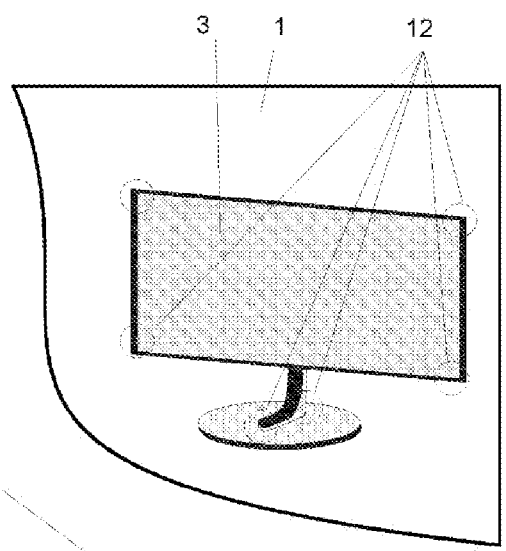
FIG. 3 shows a part of the display with a monitor image, on which there are characteristic configurations of contrast points, defined as interest points.
Figure 4:
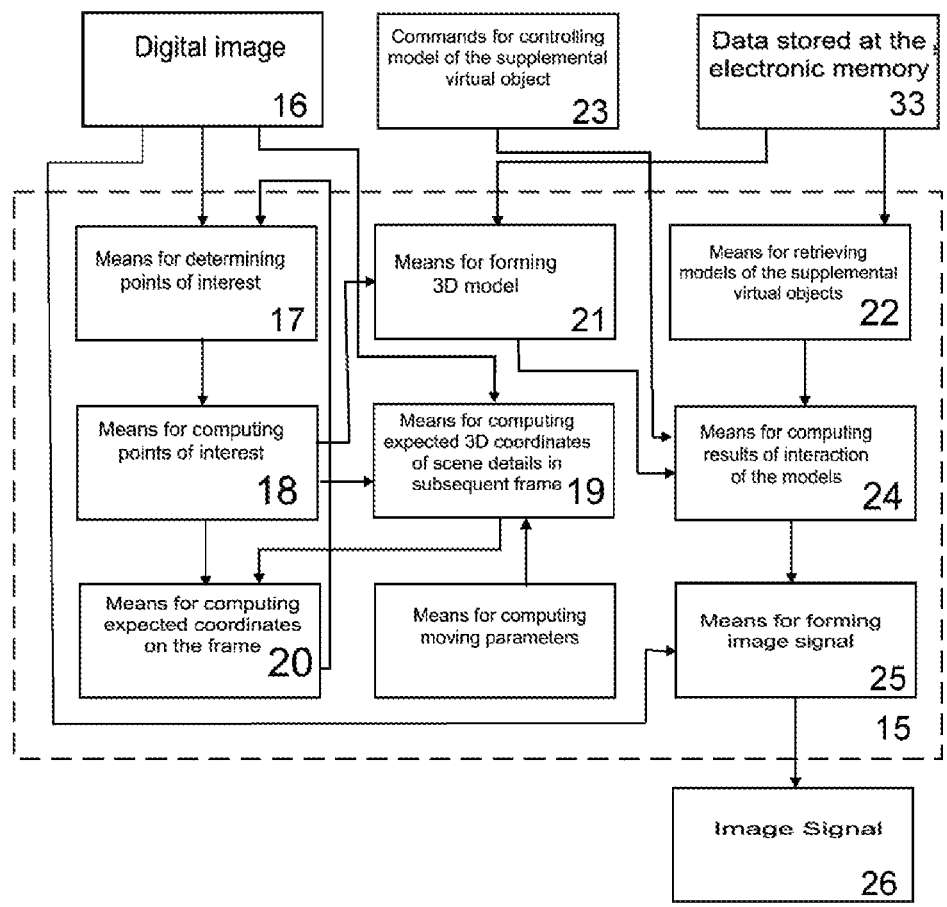
FIG. 4 shows a functional diagram of an image forming device for implementing a method of displaying an object on a 3D model.

The following keys are made in the drawings:
1—display of the imaging processing device, 2—trajectory of the imaging processing device camera, 3—flat surface of the displayed scene, 4—cylindrical surface of the displayed scene, 5—image of the additional object on the imaging processing device depicted on the display, 6, 7, 8 is the first, second and the third frames respectively, obtained from different points of the motion path of the video camera, 9—direction to the scene detail calculated from the results of processing the first frame, 10—angular dimensions of the sector in which the detail of the scene corresponding to the interest point is expected to be observed from the point of the trajectory corresponding to the second frame; 11—angular dimensions of the sector from the point of the trajectory of the third frame in which the scene detail corresponding to the interest point is expected to be observed; 12—shaded area of the refined 3D coordinates of the scene details, computed from three frames, 13—scene detail that forms the image, defined as an interest point, 14—examples of identifying interest points that have a characteristic configuration, 15—calculating means for identifying interest points, 18—means for calculating the coordinates of interest points on a frame, 19—means for calculating the 3D coordinates of a sector in which the corresponding part is expected to be observed in the next frame, 20—means for calculating the area of expected coordinates of the interest point on the frame, 21—means of forming a 3D model, 22—means for extracting the model of the additional object, 23—control body means for calculating the results of the interaction of the additional object model with the 3D model, 24—means for models interacting, 25 the means for generating the final image signal, 26—display for depicting an image, 27—start option of the image formation, and extracting the model of the additional object, 28—reveal of the interest point, 29—calculating the coordinates of the interest point, 30—calculating the 3D coordinates of the sector and coordinates of the area of the frame where it is expected to be detected an interest point, 31—checking the existence of the 3D model, 32—calculating the results of the interaction of the 3D model with the model of the additional object, 33, 34—forming the final image signal and depicting it on the display, respectively, 35—checking the presence of the program completion command, 36—completing the Program, 37—checking the condition for finding the interest point in the expected area of the frame, 38 specifying the 3D coordinates of the sector, 39—moving to the next frame.

The method of displaying an object on a 3D model consists in obtaining an image formed by the video camera, the space in the eyeshot of the camera, than reveal on the image frames the interest points, that is, groups of adjacent image points that have a characteristic configuration that persists on the set of the following one after another image frame, and determine their coordinates on the frame. Moving the video camera in an arbitrary direction and/or in accordance with predetermined recommendations and data on the parameters of the motion of the video camera is obtained, predicting on its basis 3D coordinates of sectors where it is possible to find the details of the real space displayed in the image by the corresponding interest points as a result of such movement of the video camera. In this case, the data about the motion parameters of the video camera are obtained in the form of signals containing an estimate of the direction and amount of motion of the video camera formed by the video frame-by-frame analysis means, or generated at the output of gyroscopic sensors or speed and direction sensors or acceleration sensors.

The coordinates of the area on the frame are also determined for each sector where a corresponding interest point is expected to be detected, and an interest point is searched for within the specified area on the frame, and when it is detected, the 3D coordinates of the corresponding sector are saved in the memory. In this case, the area of the search interest point frame on the frame corresponds to the 3D sector whose angular coordinates are determined, taking into account the parameters of the optical system, i.e the camera lens.

Further, when the next frame is processed, the 3D coordinates of these sectors are refined by performing the above actions on subsequent frames of the image obtained from the points of the motion path of the video camera and comparing the images of the interest points to the 3D coordinates of the corresponding sectors to construct the 3D model. In this case, as the specified 3D coordinates of the sectors, only those 3D coordinates of the sector that coincide with those computed on the previous frame of the video image.

In addition, flat and/or curved surfaces are identified on the 3D model from the analysis of the 3D coordinates of the sectors and/or the image parameters of the sections of the frame encompassing the set of interest points corresponding to these sectors.

The fragments of the model are saved in the memory, including those corresponding to the actual details of space that have ceased to come in the eyeshot of the video camera.

Images of predetermined objects are also detected and recognized, said images are stored in memory and their 3D properties are built into the 3D model.

At some stage, the model of the additional object is extracted from the memory and signals for its control within the 3D model are formed by the user's influence on the controls of the image processing device. If by this time the 3D model has already been constructed, the results of the interaction of the additional object model with the parameters of the 3D model are calculated. The size of the image of the additional object is selected based on the dimensions of the 3D model and or the user manually. Scaling and/or rotation, and/or 3D transformation and/or situational transformation of the image of the additional object are also performed when it interacts with the parameters of the 3D model.

The image signal of an additional object superimposed on the image formed by the video camera is formed and depicted on the display.

The method of mapping an object on a 3D model with an additional object is implemented as follows.

Forming with the user-moving video camera image signals, caught in the eyeshot of it the scene space, characterized by the presence of various details and the presence of individual objects. Identify on the image frames its fragments, which have a characteristic configuration and are present on a set of consecutive frames of video images, designated as interest points. Interest Points are characterized by the presence of a contrast transition of brightness or color and can correspond, for example, to the shiny edge of an object caught in the eyeshot of a video camera or the bending of a metal surface, etc.

The coordinates of interest points on the image frame are determined.

The video camera is moved inside or around the scene, which is intended to form a 3D model. The 3D coordinates of the details of the space or scene are computed and displayed as interest points on the image frames and observed from different points of camera movement. In this case, the data from the optical system of the video camera is used to determine the direction to the corresponding scene detail and predict a change in this direction caused by movement of the video camera.

To generate this forecast, data is obtained regarding the parameters of the displacement already performed, which can be obtained by applying the appropriate algorithms of time-lapse analysis of a changing image, either from the outputs of gyroscopic sensors or from velocity and direction sensors.

The predicted direction in which the corresponding space detail is expected to be detected is formed as a sector in a shape of a cone with a vertex at the location of the video camera.

The initial frame determines only the aspect direction of the details of the scene corresponding to the interest points, using data on the focal length of the camera lens and the coordinates of the corresponding interest point on the frame. Receiving subsequent frames made already from other points of the motion path of the video camera, the directions to the corresponding scene details may change, so that the coordinates of the corresponding interest points on the frame also change. At the same time, the lower the accuracy of the forecast, the wider should be the sector of the expected aspect direction of the corresponding scene detail.

The sector of the expected aspect direction corresponds to the search space on the frame within which the corresponding interest point is searched. The search space is the projection of the corresponding sector of the expected directions, and its magnitude also depends on the accuracy of the forecast. In addition, the size of the search space of the interest point is also determined by the speed of movement of the video camera.

When interest points are found in the corresponding search spaces, the 3D coordinates of the corresponding ones are stored in memory as elements of the 3D model. In the process of multiple detection of interest points in the relevant search spaces, the 3D coordinates of the sectors are refined, since observation occurs from different points of space. The refinement of the 3D coordinates of the sector means its decrease, which allows to increase the accuracy of the 3D model ad infinitum.

In this case, the refinement of 3D coordinates only concerns fixed parts of space.

To generate this forecast, obtaining data on the parameters of the displacement already performed, which can be obtained by applying the appropriate algorithms of time-lapse analysis of a changing image, either from the outputs of gyroscopic sensors or from velocity and direction sensors.

The predicted direction in which the corresponding space detail is expected to be detected is formed as a sector that is a cone with a vertex at the location of the video camera.

The initial frame determines only the direction of the observation of the details of the scene corresponding to the interest points, using data on the focal length of the camera lens and the coordinates of the corresponding interest points on the frame. Receiving subsequent frames made already from other points of the motion path of the video camera, the direction to the corresponding scene details may change, so that the coordinates of the corresponding interest points on the frame also change. At the same time, the lower the accuracy of the forecast, the wider should be the sector of the expected direction of the observation of the corresponding scene detail.

The sector of the expected direction of observation corresponds to the search space on the frame within which the corresponding interest point is searched. The search space is the projection of the corresponding sector of the expected direction, and its magnitude also depends on the accuracy of the forecast. In addition, the size of the search space of the interest point is also determined by the speed of movement of the video camera.

When interest points are detected in the corresponding search spaces, the 3D coordinates of the corresponding ones are saved in the memory as elements of the 3D model. In the process of multiple detection of interest points in the relevant search spaces, the 3D coordinates of the sectors are refined, since observation occurs from different points of space. The refinement of the 3D coordinates of the sector means its decrease, which allows to increase the accuracy of the 3D model ad infinitum.

In this case, the refinement of 3D coordinates only concerns fixed parts of space.

The set of 3D coordinates of the sectors corresponding to the interest points determines the 3D model.

Next, the 3D coordinates of the sectors are analyzed taking into account the image parameters of the corresponding sections on the frame. If the coordinates of some sectors form a flatness and the color and brightness of the corresponding image area are characterized by constancy or smoothness of the change, it is concluded that there is a fragment of the model with a flat surface limited by the corresponding sectors displayed on the frame by the corresponding interest points.

The calculated sector coordinates can vary non-linearly and characterize, for example, a cylindrical surface, then the brightness of the corresponding image region will also vary exponentially in one direction. For such fragments, a conclusion is made about the presence of a cylindrical surface.

Thus, fragments of a 3D model with various surface properties can be identified.

Also, images of the predetermined objects are detected, for example, a pencil, a mug, etc. And their 3D properties are incorporated into the 3D model.

After constructing the model, upon the command of the user forming the corresponding signals by means of the controls of the image processing device, the model of the additional object is selected and placed inside the 3D model. The controls of the image processing device are mechanical and touch buttons and keys, joysticks, voice input, and so on.

An additional object can be both virtual creatures and various virtual objects and devices, such as a car.

The model of the additional object is characterized by certain properties and can be programmed to perform certain actions or be controlled by the user, which generates, with the help of the controls, the signals of the appropriate commands for working out them by the additional object model.

The computing means of the image processing device perform the calculation of the results of the interaction of the properties of the additional object model with the parameters of the 3D model. Such results are various displacements, transformations of the image of the model of the additional object or parts of the 3D model, sound signals, etc.

The signals of the final image are generated, including the video image formed by the video camera in real time and the image of the object superimposed on it.

The image processing device for implementing the method of displaying an object on a 3D model includes a video camera whose output is connected to a corresponding input of means for locating interest points whose output is connected to the input of means for calculating the coordinates of interest points whose output through the 3D coordinate calculating means is connected to the input of means for calculating expected coordinates of the interest point on the frame whose output is connected to the corresponding input of the interest points detection means, the output of means for calculating the coordinates of interest points is connected to the input of the means for forming a 3D model, the electronic memory, whose output through the means of extracting additional object models is connected to the input of means for calculating the results of interaction of models whose output through the image signal generation means is connected to the input of the display. The parameters of the movement connected to the inputs of the means for calculating the 3D coordinates of the sector and the controls connected to the inputs of means for calculating the results of the interaction of the models.

The image processing device operates as follows.

Signals of the digital image from the output of the video camera come to the means of locating interest points, where the image fragments, which are subsequently taken as interest points, are identified. The means for calculating the coordinates of interest points provide the calculation of the coordinates of the identified interest points, on the basis of which, and taking into account the parameters of the camera lens and camera movement data, the 3D coordinates of the sector are calculated, by calculating the 3D coordinates of the sector, wherein the presence of a detail of the space previously considered as a interest point is expected to be present. Based on the 3D coordinates of the sector, the coordinates of the expected space of interest point detection in the frame are calculated.

Based on the coordinates of the detected interest points and taking into account the parameters of the camera lens, the means of processing a 3D model construct a 3D model corresponding to the 3D scene that has fallen into the eyeshot of the video camera.

The means for processing a 3D model also provide an analysis of the 3D coordinates of the sectors for detection of flat or curved surfaces.

By means of the controls, the model of the additional object is extracted from the memory, placed in the created 3D model and controlled.

The means for calculating the results of the model interaction provide the calculation of possible displacements, transformations, and other actions of the model of an additional object under conditions determined by the properties of the 3D model. The result of interaction can be a change in position, image of an additional object, its transformation sounds, etc.

In the image processing means, a final image signal is generated in which the image of the additional object is superimposed on the real-time image of the 3D scene that is provided for visualization on the display.

Figure 5:
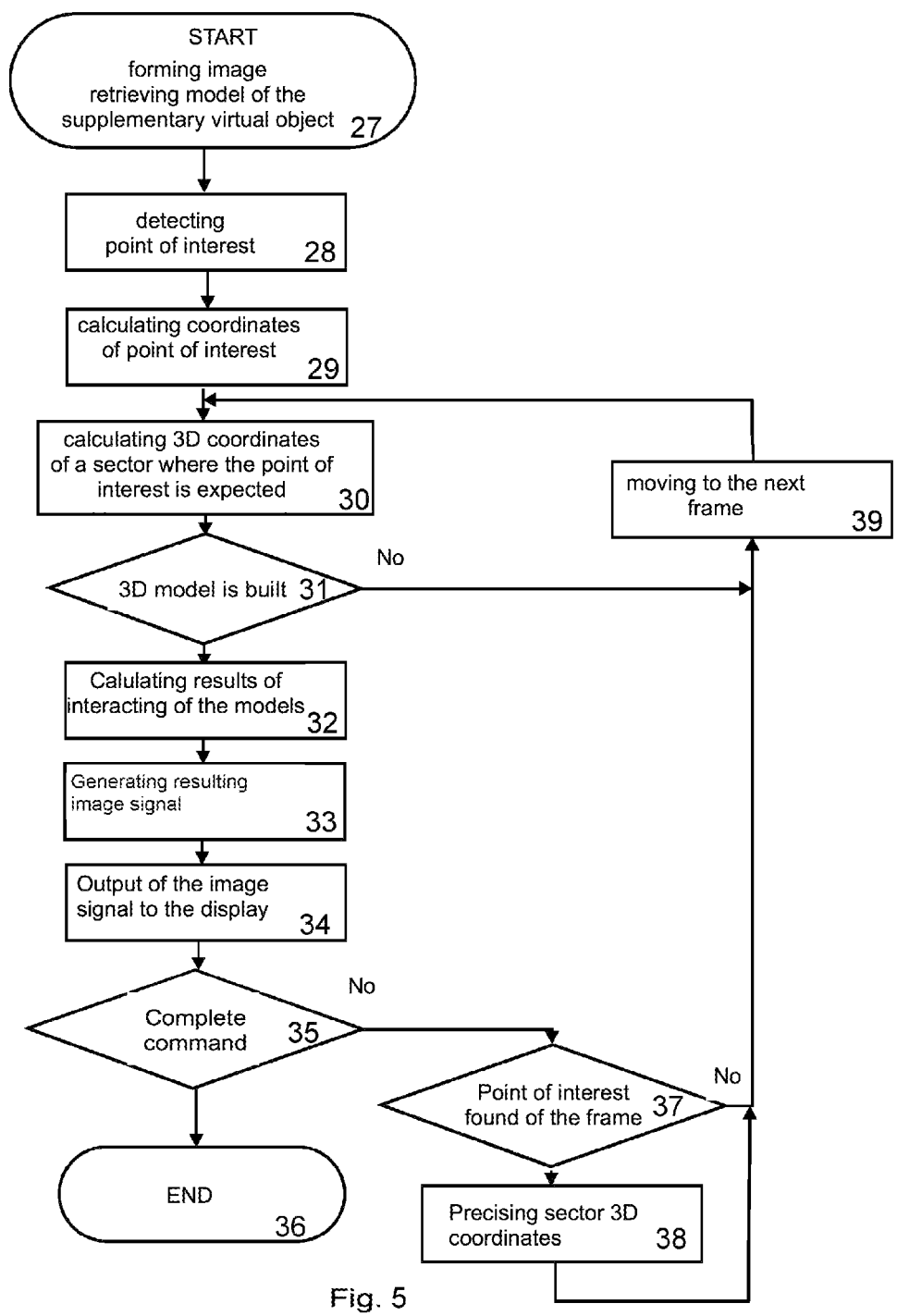
FIG. 5 shows a block diagram of the processor control program.

The computing means 15 of the image processing device are made on the basis of a processor implementing the program, the block diagram of which is shown in FIG. 5. This structural scheme realizes the implementation of the method with respect to one interest point. To implement the method with respect to the set of interest points, the same operations will be added with respect to the remaining interest points.

The program begins by obtaining a video image from the camera output and forming a command to extract an additional object of the model from the memory, as well as placing an image of an additional object in the image.

Then follow the operations of identifying the interest point and determining its coordinates, as well as calculating the 3D coordinates of the sector and the coordinates of the waiting space of the interest point on the next frame.

Further, if the 3D model is not yet created, proceed to the processing of the next frame, if the 3D model is already constructed, then the result of the interaction of the models is calculated.

The final image signal is formed and depicted on the display.

The presence of the program completion command is verified, if the command has been received, then the program is terminated, if there is no such command, then proceed to the discovery of the interest point in the previously determined area of the expected location of the interest point on the frame.

If the interest point in the expected area of the frame is not detected, then go to the next frame. If the interest point is detected in the expected area of the frame, then the 3D coordinates of the sector in which the detail of the 3D scene corresponding to the interest point is located are refined.

The way an object can be displayed on a 3D model can be carried out both with respect to terrain sites and with respect to moving objects, including in relation to the interior space of premises, and does not require the use of special surface catchers.

The way an object is displayed on a 3D model allows to form 3D models and simulate the interaction of various objects with the properties of the constructed 3D models.

Example 1

In the process of implementing the game, which can be described as a virtual pet, the user guides the video camera of the mobile phone, which is an image processing device for objects forming a scene in which he wants to place a virtual pet. The scene contains various objects and surfaces.

The image signals of the 3D scene captured by the camera are received on the mobile phone's computing facilities, where they are processed. In the process of processing image signals, it is possible to identify points on the image that have a characteristic configuration: interest points. Interest points are a collection of nearby image pixels being a representation of contrasting details of the surface of a scene, such as corners, protrusions, etc.

In this case, the angular values ($\varphi$ directions for the detail of the 3D scene, corresponding to the interest points on the frame, are determined, for example, according to the expression:

$$\varphi = \arctan(d/f), \text{ where:}$$

d—the coordinate of the deviation from the optical axis,
f—the focal length of the optical system of the video camera.

The mobile phone's camera is moved arbitrarily or according to the prompts generated by the software, aimed at accelerating the creation of a 3D model.

As a result of frame-by-frame analysis of the video image, an evaluation is made of the parameters of the motion of the mobile phone's video camera, while continuing to depict the image on the display.

Based on the obtained estimation of the displacement parameters, angular sectors are predicted, where the details of the scene to which the interest points correspond is expected to be seen. These corner sectors correspond to the search spaces on the video image frame. Within the specified search spaces, the search and discovery of the corresponding interest points are performed and the 3D coordinate areas of the corresponding scene detail are calculated.

Further moving the video camera and calculating 3D coordinates from different viewing angles provide clarification of the 3D coordinates of the corresponding sectors, on the basis of which a 3D model is formed.

In the 3D model, fragments of a flat or curved surface are identified. So, if the coordinates of a part of the sectors are characterized by flatness, and the corresponding image have a uniform brightness and color, then it is assumed that this model fragment corresponds to a flat surface and assigns a portion of the property of a flat surface in the contour of the indicated group of points.

Further, according to the user's commands, at least one pet is selected from the memory and placed on the image, which is already described by the 3D model.

The pet is a model of a certain creature whose actions are programmed in time in advance. The pet, in accordance with the set program, can move, grow, make sounds, react to obstacles, etc. The pet model program also assumes various transformations of its image.

The pet model program, in addition to the autonomous movements, also assumes the user's control with the help of mobile phone controls.

The final image signal including the pet image superimposed on the image of the scene captured by the video camera is applied to the corresponding inputs of the display of the mobile phone for depicting.

Example 2

In the process of implementing the game, of the automotive theme, the user guides the video camera of a mobile phone or smartphone that is an image processing device on a horizontal surface, for example a table on which various objects are placed: a vase, pencils, a book and other items.

The video image that is generated by the video camera is received by the computing facilities of the mobile phone for processing. During the processing of the video image, the detection of contrasting, time-stable, multi-pixel objects in the image is sensed as their interest points.

The mobile phone video camera is moved, measuring the coordinates of the parts of the 3D scene corresponding to the points of interest on the received frames. In this case, the motion parameters of the video camera are calculated based on the signals received from the gyro transmitters of the mobile phone.

The 3D coordinates of the sectors corresponding to the interest points are computed and refined with the results of processing images of subsequent frames. Refined in the process of moving the video camera, the 3D coordinates of the sectors associated with the corresponding points of interest determine the 3D model.

Within the 3D model, fragments are identified, within which the coordinates of the sectors are characterized as flat or curved surfaces. This may correspond, for example, to the surface of a table or other object.

If the color of a group of neighboring points is uniform, and the shape of their contour has a linear elongated structure, then it is assumed that this group of points corresponds to a pencil and assigns to the specified group of points the properties of a solid object whose elevation above the surface corresponds to its width, etc.

After the 3D model is constructed at the command of the user, the vehicle is selected from the set of stored at the mobile phone to output it to the image. The selected vehicle, for example, an SUV, has initial dimensions proportional to the dimensions of the frame, for example, 1/20 of the image area, which can be adjusted by the user. When the position of the mobile phone camera changes, the vehicle image dimensions are kept proportional to the distances between sectors corresponding to the interest points or the sizes of the detected objects. For example, when the camcorder approaches the table on which the vase is standing, the image of the SUV is formed so that its size remains proportionate to the size of the vase and/or table.

Next, the user generates commands to move the vehicle within the image using the phone's controls.

The computational means provide a comparison of the vehicle model parameters with the surface parameters on which the indicated vehicle occurred and determine whether it is possible to perform the movement in a given direction. If the movement is possible, an image of the moving vehicle is formed if the predetermined movement is not possible, for example, due to the presence of a barrier in the path exceeding the dimensions of the vehicle, the image of the vehicle stopped in front of the obstacle with the visualization of the emergency is formed.

In situations of overcoming obstacles, the vehicle image is formed with the corresponding deformations of the axle and body, slopes, rotating elements, tilting if the surface provided by the model is inclined, etc. So, for example, the diameter of the wheels of a car can allow it to overcome a pencil lying in its path, but vase standing on its way will be an insurmountable obstacle, which caused the car to stop.

The model of the car, extracted from the memory is characterized by certain parameters, speed limits, wheel sizes, suspension parameters, etc., which are used when working out the movement of the car and changing its image during the movement, for example, in bends, or when overcoming obstacles.

In the course of the game, a video signal is generated that imposes a superimposition of the vehicle image on the image formed by the video camera and feeds it to the inputs of the mobile phone display for depicting.

The user, reacting to the image of a moving vehicle, corrects the direction of movement, forming commands using the controls of the mobile phone.

Example 3

The image processing device is mounted on the car and is designed to assist the driver in a difficult situation. It includes a video camera, a processor with memory and a monitor. A scene is a section of the road in front of or behind the car.

In the process of overcoming obstacles, the image from the camera's output goes to computational means, where interest points of the image are revealed, as contours of some objects having characteristic brightness and/or color and their coordinates.

During the movement of the car, signals that characterize the displacement, speed and direction are also input to the processor inputs.

Calculating the 3D coordinates of the sections of the road corresponding to the interest points form a 3D model of the section of the road caught in the eyeshot of the video camera.

While some sections of the road may have characteristic features. So the puddle is displayed as a reflecting surface, the pit and hummock have lighted and darkened areas, on which it is possible to draw conclusions about the presence of these objects on the road. Also, marking elements, edge of the road, curb, steep slopes or descents, tree trunks, etc., can be identified.

A 3D model containing the properties of the identified objects allows predicting the consequences of moving a car in a given direction. If in accordance with the current direction and speed dangerous consequences are possible due to the presence of one of the identified obstacles, this obstacle is highlighted in the final image by the color depending on the danger.

The resulting image is the combination of the portion of the road received from the video camera and the position of the vehicle, predicted for a few seconds ahead, and also the allocated hazardous areas superimposed on it. This final image is output to the display, so that the driver is able to change the driving parameters if necessary.

In this example, the model of the additional object is the vehicle's technical characteristics and the parameters of its movement, the initial coordinates are the fixed coordinates at the beginning of the motion.

The method of displaying an object on a 3D model can be implemented using standard elements and components of a digital electronic database, including means for converting optical information into electrical signals, computing means, and electronic memory and screening means.

Thus, the invention has a wider field of application by allowing the formation of a 3D model without involving additional data on the explored region, such as elevation maps, the possibility of forming a 3D model of movable objects or the internal space of objects, and also provides the possibility of obtaining 3D model interaction with models of different objects results.

What is claimed is:

1. A method for displaying a virtual object on a 3D model, comprising:
    obtaining a real space image formed by a video camera and forming a 3D model based upon the real space image, said real space image comprising one or more frames, further comprising:
        detecting one or more interest points on at least one frame of the one or more frames of the real space image and determining interest point coordinates on said at least one frame, wherein the one or more interest points is a group of adjacent image points having a characteristic configuration that persists on a plurality of successive image frames;
        moving the video camera, and based upon parameters of said moving, predicting 3D coordinates of one or more predicted sectors where real space details displayed of the real space image could be located as interest points,
        determining coordinates of one or more areas in the one or more frames, for each of the predicted sectors where a corresponding interest point is expected to be detected,
        searching for the corresponding interest point within the one or more predicted sectors, and once detected saving 3D coordinates of the corresponding interest point to a memory,
        refining the 3D coordinates of the one or more predicted sectors by performing the above steps on subsequent frames of the real space image obtained by the video camera while moving the video camera,
        juxtaposing 3D coordinates of the interest points in their respective predicted sectors to the 3D model thereby identifying flat and/or curved surfaces,
        retrieving from the memory a supplementary virtual object and forming signals for control of the supplementary virtual object based upon identified surfaces of the 3D model, and
        forming and outputting to depict on a display an image signal of the supplemental virtual object superimposed on the real space image.

2. The method according to claim 1, wherein the search area of the interest point on a frame corresponds to a 3D sector whose angular coordinates are determined taking into account the parameters of an optical system of the video camera.

3. The method according to claim 1, wherein an image size of the supplemental virtual object is selected based on dimensions of the 3D model and/or by a user manually.

4. The method according to claim 1, wherein a scaling and/or rotation is performed, and either a 3D transformation and/or a situational transformation of the supplemental virtual object image is performed, when the supplemental virtual object interacts with the parameters of the 3D model.

5. The method according to claim 1, wherein data is received on moving parameters of the video camera in the form of signals containing an estimate of a direction and magnitude of a motion of the video camera generated by a video frame-by-frame analysis means.

6. The method according to claim 1, wherein data is received on moving parameters of the video camera in the form of signals containing an estimate of the direction and magnitude of movement of the video camera via outputted gyroscopic sensors or speed and direction sensors or acceleration sensors.

7. The method according to claim 1, wherein the signals for control of the supplementary virtual object are formed by a user's action on controls of an image processing device.

8. The method according to claim 1, wherein a movement of the video camera is performed in an arbitrary direction and/or in accordance with predetermined promptings.

9. The method according to claim 1, wherein only 3D coordinates of a sector that are the same as the coordinates computed on a previous frame are stored as refined 3D coordinates of the predicted sectors.

10. The method according to claim 1, wherein images of predetermined objects are detected and 3D properties of the predetermined objects are embedded in the 3D model.

11. The method according to claim 1, wherein fragments of the model are stored in the memory, including those fragments corresponding to real features of a real space that have ceased to fall into an eyeshot of the video camera.

12. The method according to claim 1, wherein the flat and the curved surfaces are identified on the 3D model based upon an analysis of 3D coordinates of the predicted sectors.

13. The method according to claim 1, where on the 3D model, flat and/or curved surfaces are detected based upon an analysis of image parameters of the predicted sectors of the one or more frames encompassing a plurality of interest points.

* * * * *